Dec. 19, 1939.    R. W. THORNALLY    2,183,898
INSULATION TESTING
Filed Jan. 24, 1938    2 Sheets-Sheet 1

INVENTOR.
RALPH W. THORNALLY
BY Oswald D. Milmore
HIS ATTORNEY

Dec. 19, 1939.    R. W. THORNALLY    2,183,898
INSULATION TESTING
Filed Jan. 24, 1938    2 Sheets-Sheet 2

INVENTOR.
RALPH W. THORNALLY
BY Oswald P. Milmore
HIS ATTORNEY

Patented Dec. 19, 1939

2,183,898

UNITED STATES PATENT OFFICE 2,183,898

INSULATION TESTING

Ralph W. Thornally, Berkeley, Calif.

Application January 24, 1938, Serial No. 186,627

13 Claims. (Cl. 175—183)

This invention relates to a method and apparatus for testing the condition of insulating material or of electrical devices having insulating material as a part thereof, the insulating material or electrical device having a reactive impedance, such as a capacitance, associated therewith. While not limited thereto, my invention finds particular application in the testing of spark plugs of the type used in internal combustion engines with a view of determining the condition of the porcelain or other insulating material and the ability of the spark plug to function efficiently.

It is an object of this invention to provide an improved method and apparatus for determining the conditon of an insulator by measuring its effect on a high frequency current impressed thereon, under conditions compensating for the naturally associated reactive impedance, such as a capacitance, of the insulating material or electrical appliance forming a part thereof.

A further specific object is to afford an improved method and apparatus for giving a visual indication of the condition of a spark plug, either disconnected, as in factory or sales room testing, or secured to an internal combustion engine in its normal operating position, regardless of the spacing of the points or of the magnitude of the natural capacitance associated therewith. Ancillary thereto, it is an object to permit the spark plug to be tested when cold or when heated, immediately following the operation of an internal combustion engine of which it is a part.

Another object is to provide a testing device of the type described for testing spark plugs or similar appliances which is light in weight and easily portable, and which may be either complete in itself, or operated by externally supplied direct current or alternating current power from a central station supply, which may be applied either directly or through the medium of a transformer or a rectifier.

With these and other objects in view, which will become apparent from the following specification, taken together with the drawings, the invention resides in the arrangement of electrical circuits and in the method of operation described below, and defined in the appended claims. Briefly, my testing arrangement comprises a radio frequency oscillating circuit, comprising means for generating a radio frequency current therein and means for indicating the intensity of the radio frequency current; electrical connectors adapted to be attached to the terminals of the spark plug or other insulating means to be tested, arranged to connect said spark plug or insulator across an impedance of the circuit, so as to lower the intensity of the radio frequency current indicated, said lowering being relatively greater as the quality of the insulator is relatively poorer; and means, in the radio frequency circuit for re-resonating the circuit by compensating for the reactive impedance of the spark plug or other insulator, preferably a variable impedance as, for example, a variable condenser or a variable inductance. The variable condenser, which constitutes the preferred re-resonating means, may be connected in any suitable manner, such as across said connectors, or directly in shunt with such impedance, or with a portion thereof, it being understood that said impedance may comprise an inductance or a capacitance and an inductance in series.

The method of testing, which may be carried out with many types of circuits or devices, several of which are described herein, may be carried out as follows, it being understood that the sequence of operations may be varied: When the electrical connectors are unattached to the insulator, the variable condenser or other resonating means may be adjusted to resonate the circuit, and the intensity of the radio frequency current is read on the indicating means. This intensity is taken as the origin of measurement. The electrical connectors are then attached to the insulator, and the circuit is re-resonated, i. e., it is adjusted until the maximum intensity of radio frequency is obtained, and the reading is noted. The latter reading, which indicates an intensity of radio frequency current not greater than the intensity corresponding to the origin of measurement, is compared with said origin of measurement, thereby determining the condition of the insulator, since the difference between the two readings is greater as the quality of the insulator is poorer. While the use of radio frequency circuit of fixed characteristics, i. e., one in which all electrical elements save the re-resonating means are non-variable, is not essential to the operability of the invention, in the preferred embodiment thereof these characteristics are determined beforehand, so that the origin of measurement is a fixed quantity for the apparatus. The indicating means may then be calibrated so as to yield a direct reading of the quality of the insulator, either in terms of resistance, or similar exact units, or in terms of estimated life of the spark plug or relative merit, such as "excellent", "good", "poor" and "defective", each expression covering a definite range on the indicator.

The invention may be more fully understood by referring to the following specific description and the drawings, in which.

Figure 2:
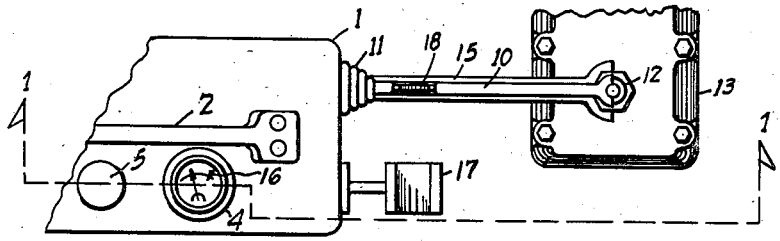
Figure 2 is a fragmental plan view of the apparatus shown in Figure 1.
Figure 1:
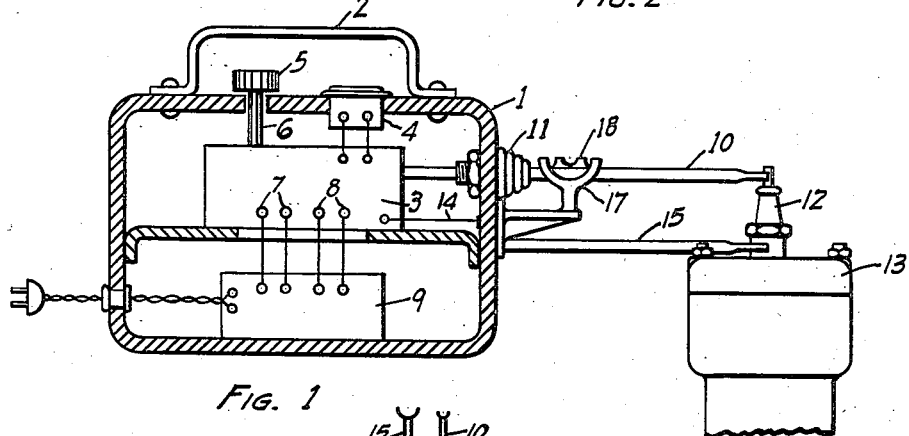
Figure 1 is a vertical sectional view, partly in elevation, taken along line 1—1 of Figure 2, showing one embodiment of the testing apparatus as applied to a spark plug attached to an internal combustion engine.

Referring to Figures 1 and 2, 1 represents a metallic container housing the electrical equipment and providing an electrostatic shield therefor, provided with a handle 2 for conveniently supporting the same. Suitably mounted therein is an oscillator unit 3, including electrical elements for generating and measuring a radio frequency current. The intensity of the current is indicated by visual indicating means 4, visible through an opening in the container; the indicating means may be in the form of a milliammeter, thermocouple ammeter, neon tube, cathode ray tube, or an electric light bulb provided with means for comparing successive intensities, or any similar device. The re-resonating means, such as a variable condenser, within the oscillator unit may be adjusted by means of a knob 5, mounted on a shaft 6. Electrical energy is supplied to the oscillator unit at connections 7, 8, from a power unit 9, which may comprise a battery, or a transformer, or a rectifier, or directly from a central station supply.

A contact bar 10, preferably of relatively short length, is mounted to extend laterally from one side of the container, and insulated therefrom by means of a supporting bushing 11, constructed of material of good insulating properties. The outer terminus of the bar 10 is shaped to permit convenient application to the core terminal of a spark plug 12, from which the jumper wire has been removed. As shown, the spark plug 12 is secured to the cylinder head 13 of an engine. The inner end of the bar 10 is electrically connected to the oscillating circuit, either directly or through a series condenser, and constitutes one of the two electrical connectors therefor.

The second electrical connector from the oscillating circuit comprises a ground wire 14 from the circuit to the container; a second bar 15, electrically connected to the container beneath the bar 10, shaped to engage the body of the spark plug when the bar 10 is engaged with the core terminal. While it is possible to connect the insulated bar 10 to the grounded body portion of the spark plug and the bar 15 to the core terminal, more consistent results are obtained by employing the arrangement shown in the drawings.

The operation of the testing device is as follows: The oscillator is preferably constructed with fixed characteristics of all elements except the re-resonating means. The intensity of the radio frequency oscillations when the knob 5 is adjusted for maximum intensity when the bars 10 and 15 are disconnected from the insulator or spark plug to be tested may be marked on the indicating means by an arrow 16. To test the plug, the bars 10 and 15 are engaged with the spark plug terminals, and the knob 5 is rotated to indicate a maximum intensity on the indicator 4, and the reading is noted. The entire test requires only a few seconds to complete. It may be desirable to make successive tests of the same plug, first with the jumper wire from the distributor disconnected, and then either on the jumper wire alone or on the spark plug with the jumper wire connected, to obtain an indication of the condition of the wiring insulation.

When the spark plug is not attached to the engine, as when testing a new plug or in factory testing, the plug is placed upon a cradle 17, electrically connected to the container 1, so that the body of the plug makes contact with the cradle, and the terminal engages a contact clip 18 on the bar 10.

The oscillator unit may comprise any convenient oscillator circuit, provided with an oscillator generator and with means for indicating the intensity of the radio frequency current. The expression "radio frequency circuit", as used in the present specification and claims, includes both the generator and the indicator, as well as amplifying circuits either in the generating or in the indicating circuit, when employed. A self-controlled or a crystal oscillator circuit may be used. Examples of suitable oscillator generator circuits are then Hartley, the tuned-plate, tuned-grid, the Coplitts, the Ultraudion, the TNT, the electron-coupled, the triode, the pentode circuits, and push-pull variations thereof, (see The Radio Amateur's Handbook, American Radio Relay League, fourteenth edition, 1937, pages 142 and 149). The electrical connectors, i. e., the bars 10 and the wire 14, may be connected across any part of the circuit which will cause the indicated intensity of the radio frequency current to be progressively lowered as the quality of the insulating material connected to the connectors is poorer, the circuit being re-adjusted to resonance in each instance. While I prefer to employ a variable condenser for this purpose, the circuit may also be re-resonated by varying an inductive reactance in the circuit.

Figure 3:
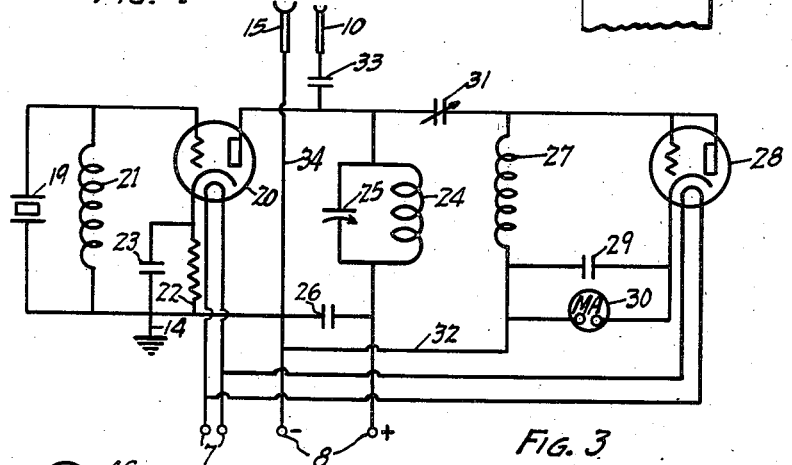
Figures 3, 6, 7 and 8, are schematic wiring diagrams showing certain circuits which are suitable for use in the device shown in Figure 1.

One form of wiring diagram is shown in Figure 3; it comprises a triode crystal oscillator generator circuit and a metering circuit coupled thereto. The frequency of this circuit is controlled by a quartz crystal 19 having a piezo electric effect, which is in the grid circuit of a triode oscillator tube 20, and is in shunt with a radio frequency choke coil 21. The cathode of the tube is biased by a resistance 22 and a by-pass condenser 23. The plate circuit, comprising an inductance 24, a variable condenser 25, controlled by the knob 5, and a condenser 26 (which may be either fixed or variable), is tuned to resonance with the grid circuit. Thus, by manipulating the variable condenser 25 to resonate the circuit, the feed back of the oscillator tube generates and maintains the oscillations in the grid circuit. The use of a crystal is not essential, since any other element or combination of elements which will give the grid circuit a resonant frequency of a convenient value may be substituted; for consistent results the use of such a crystal is, however, advisable. The filament may be heated by direct or alternating current supplied by the wires 7; and the plate current may be supplied by the wires 8. While for the same plate voltage, a greater intensity of current is usually obtained by employing a direct current on the plate, as indicated in Figure 3, an alternating current may also be employed.

Any form of metering circuit may be employed; among circuits employing vacuum tubes, may be mentioned the diode rectifier, grid bias detection, and grid leak or grid detection. Whether an increased intensity of radio frequency current will cause a numerically greater or smaller reading in the milliammeter asociated therewith depends upon the particular circuit employed, it being understood that any circuit may be employed.

The metering shown in Figure 3 circuit comprises: A radio frequency choke coil 27, a vacuum tube 28, acting as a diode rectifier, a condenser 29, and a milliammeter 30, which functions as the indicating means 4 shown in Figures 1 and 2, these elements being interconnected as shown in the drawing, and the tube 28 being heated by current from the wires 7. This circuit is coupled to the oscillator generator circuit by means of a fixed or a variable condenser 31 and connection 32.

The core electrode of the spark plug or a terminal of the insulating material to be tested may be connected, through the bar 10, the latter being preferably connected to the plate of the oscillator tube 20 through a condenser 33. The other spark plug terminal is connected through the bar 15 to a connection 34 whereby the spark plug is connected to shunt with an impedance including the inductance 24 and the condenser 26. The connectors to the spark plug may, however, be otherwise connected, as, for example, directly in shunt with the inductance 24 as shown in Figure 6; also, the condenser 33 may be omitted, as shown in Figure 7.

In the circuit of Figure 3, the magnitude of the reading on the milliammeter 30 is a function of the intensity of the radio frequency current flowing therein, and for an open circuit for the bars 10 and 15, it can be adjusted or tuned to resonance by means of the condenser 25, whereby a maximum reading on the milliammeter is obtained. Such maximum reading is indicated by the mark 16 on the dial, as shown in Figure 2, in the case of a circuit which is intended to measure a fixed range of resistances in the insulators, and the quality of the insulators are calibrated downwardly from this. It sometimes happens that, due to variations in the potential of the power or other variable factors, the initial maximum reading is not exactly equal to the mark 16; in this event the circuit may be adjusted by means of any suitable electrical element, such as the variable condenser 31, which is preferably controlled by a knob located within the container, until the maximum reading obtainable by adjustment of the condenser 25 corresponds to the mark 16. The condenser 31 or other element, once adjusted in this manner, is not altered during the operation of the instrument. Alternatively, the milliammeter may be simply graduated in arbitrary units, without indicating a fixed maximum, and the extent of deterioration of the insulator is determined by taking an initial reading for the open circuit, and a second reading, as described below, and subtracting the two.

The bars 10 and 15 are then connected to the terminals of the insulation or spark plug, the condenser 25 is adjusted to obtain a maximum reading, and the quality of the insulation or spark plug is indicated on the milliammeter. If the electrodes are short circuited the radio frequency generator will immediately fail to operate and no reading (or a very low reading depending on the size of the condenser 33) will be registered upon the milliammeter 30, indicating a defective condition. If, however, the electrodes are not short circuited the radio frequency generator will set up oscillations upon adjustment of the variable condenser 25 to compensate for the added capacity introduced by the spark plug and the electrical connectors leading thereto. The spacing of the electrodes in the spark plug gap has no effect upon the maximum reading thus obtained, as any variation in this spacing is balanced out or compensated for by the condenser 25. Thus, the radio frequency voltage developed across the inductance 24 is impressed upon the electrodes of the spark plug. The condition of the porcelain insulation of the spark plug or of the spark plug porcelain and of the jumper wires together, will determine the amount of radio frequency energy which will be lost or dissipated therein. The energy lost in the insulation being tested will thus reduce the amount of energy impressed on the metering circuit and thus will be indicated by a reduction in the reading of the milliammeter 30.

Figure 6:
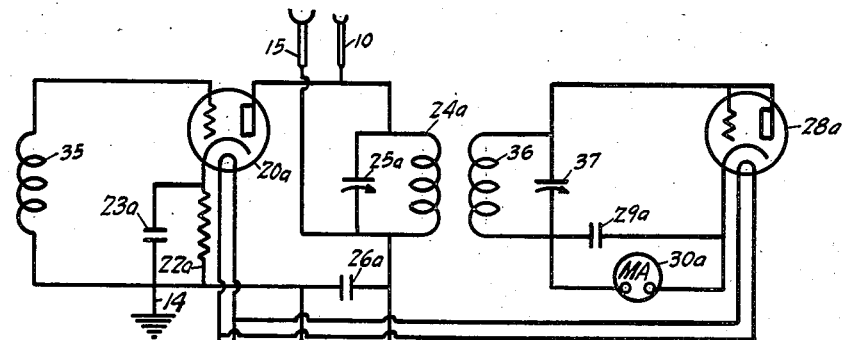
Figure 7:
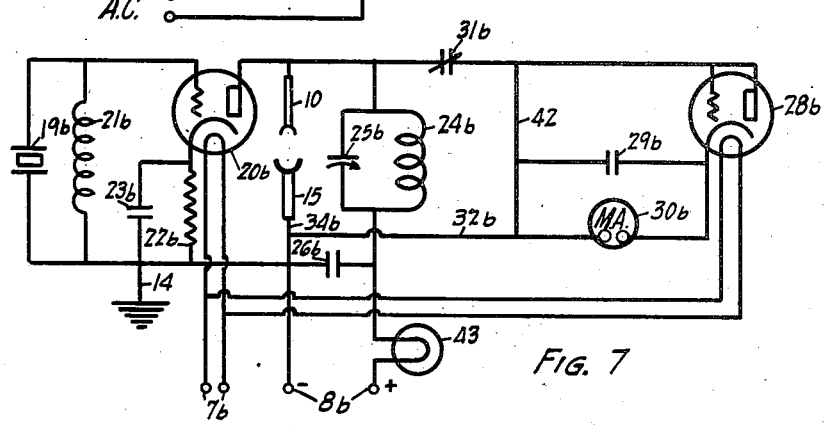

In the arrangement shown in Figure 6, the radio frequency oscillating circuit comprises an inductance 35 substituted for the crystal 19 and choke coil 21, the metering circuit is inductively coupled to the oscillator generator by means of an inductance 36, having a condenser 37 in shunt therewith; the bars 10 and 15 for connection to the terminals of the insulation to be tested are connected directly in shunt with the inductance 24a, the condenser 33 being omitted although a connection so as to include the condenser 26a, in series, as in Figure 3, is used. Other reference characters, followed by the letter a, indicate parts corresponding to those in Figure 3. The plate current may be direct current, as in Figure 3, or alternating current, as shown, supplied from a transformer 38, having a primary winding 39, a secondary winding 40 for supplying filament energy, and a secondary winding 41 for supplying plate energy. The operation is as described above. For calibrating the circuit to cause the milliammeter to indicate the correct initial reading for the open circuit, the coupling between the inductances 24a and 36 may be varied. It should be noted that the condenser 37, which may be fixed, is not an indispensable part of the circuit, since the inductance 36 can be constructed to have its natural value of inductance resonant with that of the radio frequency generator.

The circuit according to Figure 7 is similar to that in Figure 3, differing therefrom (a) in that the radio frequency choke coil 27 is omitted, and replaced by a direct connection 42; and (b) in that the condenser 33 is omitted, and the plate current supply is protected by a lamp 43 placed in series. Similar reference characters, followed by the letter b, indicate like elements. The lamp 43 will glow only when there is a short circuit in the spark plug or other device being tested, and may be mounted so as to be visible externally of the container.

The preferred form of milliammeter is the moving coil type; other types may, however, also be employed.

Instead of a milliammeter connected in a metering circuit as shown in Figures 3, 6 and 7, I may employ other indicating devices which will be responsive to the intensity of the radio frequency oscillations. Thus a thermocouple ammeter or a neon tube may be used instead; the indicating device may be connected or coupled to the generator as shown in Figures 3 to 8, inclusive.

Figure 4:
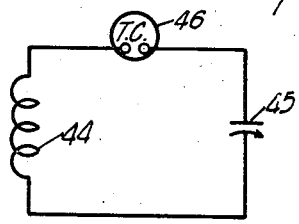
Figures 4 and 5 are fragmental wiring diagrams showing modifications of portions thereof.
Figure 8:
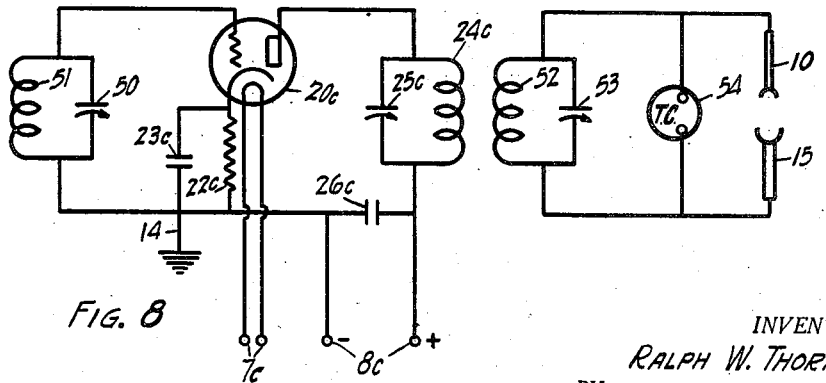

According to Figure 4, an inductance 44 is connected in series with a condenser 45 and a thermocouple ammeter 46, the inductance being coupled, inductively or otherwise, to the radio frequency oscillator generator such as, for example, that shown in Figure 6 or 8.

Figure 5:
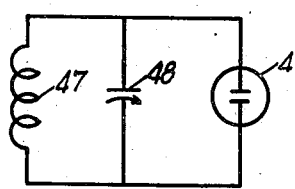

According to Figure 5, an inductance coil 47 is connected in shunt with a condenser 48 and a neon tube 49, the inductance being coupled to a radio frequency oscillator generator, as described for Figure 4. The neon tube or similar luminous tube may be arranged to result in partial illumination, the extent of which along the length of the tube is dependent upon the intensity of the radio frequency current, whereby a quantitative determination of the condition of the insulator is afforded.

Instead of inductance coils 44 and 47, the indicating circuits of Figures 4 and 5 may be connected directly through the condenser 31b as shown in Figure 7. The condensers 45 and 48 may be fixed, or may be employed to calibrate the instrument.

As was pointed out above, the insulator to be tested may be connected to any portion of the circuit at which the indicated intensity of the radio frequency current is lowered by losses in the said insulator. The connection may be in the amplifying portion or in the metering portion of the circuit instead of in the generating portion. One illustrative embodiment of such an arrangement is shown in Figure 8, which comprises an oscillator generator, similar to that shown in Figure 6, but supplied with direct current power and provided with a condenser 50 in shunt with an indutcance 51, for tuning the grid circuit; similar elements are shown by similar numbers, followed by the letter c. The condensers 25c and 50 may be fixed, or may be variable for calibration purposes. The metering circuit comprises an inductance coil 52, in inductive relationship with the inductance 24c in shunt with a variable condenser 53, controlled by the knob 5 on the outside of the container, and further in shunt with a thermocouple ammeter 54. The movable plate side of the condenser 53 is connected to the bar 15; it may, if desired, be grounded and thereby connected to the oscillator generator circuit; the other terminal of the condenser 53 is connected to the contact bar 10, as shown. The operation of the circuit according to Figure 8 is as described above, the condenser 53 being employed to re-resonate the circuit each time the device is applied to an insulator for test purposes.

Any radio frequency may be employed in connection with the above-described circuits. It was, however, found that best results are obtained by using frequencies above about 7 megacycles, and, preferably, above 28 megacycles.

While I have shown certain specific embodiments of the invention, for the purpose of indicating some of the variations possible therein, it is understood that my invention is not restricted to any of the specific forms disclosed, since numerous variations may be made without departing from the spirit and scope of the invention, as defined in the appended claims.

Although in the preferred embodiments described above the radio frequency circuit is re-resonated by a manipulation of the knob 5, this step and the variable re-resonating means therefor may be obviated in certain cases, as when testing only spark plugs of substantially the same size, in which case the characteristics of the circuit may be fixed to a condition of resonance when the spark plug is connected to the shunting means.

I claim as my invention:

1. A method of testing an insulating material having an unknown reactive impedance associated therewith, comprising the steps of measuring the intensity of radio frequency current in a radio frequency oscillatory circuit substantially tuned to resonance, connecting the terminals of said insulating material to said circuit so as to impress a radio frequency potential across its terminals, re-resonating said circuit, measuring the intensity of the radio frequency current with the insulating material connected as aforesaid, and comparing the two measured intensities.

2. A method of testing an insulating material having an unknown reactive impedance associated therewith, comprising the steps of measuring the intensity of radio frequency current in a radio frequency oscillatory circuit substantially tuned to resonance, connecting the terminals of said insulating material to said circuit so as to impress a radio frequency potential across its terminals, measuring the intensity of the radio frequency current with the insulating material connected as aforesaid, and comparing the two measured intensities.

3. A method of testing a spark plug comprising the steps of measuring the intensity of a radio frequency current in a radio frequency oscillatory circuit substantially tuned to resonance, connecting the electrodes of said spark plug to said circuit so as to impress a radio frequency potential across its electrodes, re-resonating said circuit, measuring the intensity of the radio frequency current with the insulating material connected as aforesaid, and comparing the two measured intensities.

4. Testing apparatus for spark plugs or like dielectric devices comprising means for generating electrical oscillations of predetermined frequency, an oscillatory circuit coupled to said generating means, a metering circuit associated with said oscillatory circuit and calibrated in accordance with the energy losses therein, means for connecting the device to be tested effectively in said oscillatory circuit, and means for resonating said oscillatory circuit to said predetermined frequency with and without said device to be tested, whereby said metering circuit may be read to determine the loss introduced into said oscillatory circuit by said device irrespective of its reactive impedance.

5. Testing apparatus for spark plugs or like dielectric devices comprising means for generating electrical oscillations of predetermined frequency, an oscillatory circuit coupled to said generating means, a metering circuit associated with said oscillatory circuit and calibrated in accordance with the energy losses therein, means for adjusting the energy transfer from said oscillatory circuit to said metering circuit to give a predetermined maximum reading, means for connecting the device to be tested effectively in said oscillatory circuit, and means for resonating said oscillatory circuit to said predetermined frequency both with and without the device to be tested to cause maximum energy to circulate therein under both conditions, whereby said metering circuit will give indications of losses introduced by said tested device which are directly comparable irrespective of the actual energy circulating in said oscillatory circuit.

6. Testing apparatus for spark plugs or the like comprising an electronic oscillator, means for stabilizing said oscillator to operate at a fixed predetermined frequency, an oscillatory circuit coupled to said oscillator, a metering circuit associated with said oscillatory circuit and calibrated in accordance with the energy losses therein, means for connecting the device to be tested effectively in said oscillatory circuit, and means for resonating said oscillatory circuit to said predetermined frequency with and without said device to be tested, whereby said metering circuit may be read to determine the loss introduced into said oscillatory circuit by said device irrespective of its reactive impedance.

7. Testing apparatus for spark plugs or the like comprising an electronic oscillator, a piezo electric crystal connected to stabilize said oscillator to operate at a fixed predetermined frequency, an oscillatory circuit coupled to said oscillator, a metering circuit associated with said oscillatory circuit and calibrated in accordance with the energy losses therein, means for connecting the device to be tested effectively in said oscillatory circuit, and means for resonating said oscillatory circuit to said predetermined frequency with and without said device to be tested, whereby said metering circuit may be read to determine the loss introduced into said oscillatory circuit by said device irrespective of its reactive impedance.

8. Testing apparatus for spark plugs or the like comprising an electronic oscillator, means for stabilizing said oscillator to operate at a fixed predetermined frequency of not less than 7 megacycles per second, an oscillatory circuit coupled to said oscillator, a metering circuit associated with said oscillatory circuit and calibrated in accordance with the energy losses therein, means for adjusting the energy transfer from said oscillatory circuit to said metering circuit to give a predetermined maximum reading, means for connecting the device to be tested effectively in said oscillatory circuit, and means for resonating said oscillatory circuit to said predetermined frequency both with and without the device to be tested to cause maximum energy to circulate therein under both conditions, whereby said metering circuit will give indications of losses introduced by said tested device which are directly comparable irrespective of the actual energy circulating in said oscillatory circuit.

9. A portable spark plug tester comprising a metallic case, an electronic oscillator mounted within said case, an oscillatory circuit within said case, a loss metering circuit associated with said oscillatory circuit, means controllable from without said case for resonating said oscillatory circuit to the frequency of said oscillator, and a pair of arms projecting rigidly from said case and connected across said oscillatory circuit, the ends of said arms being shaped to engage respectively the central terminal and the bushing of a spark plug to be tested.

10. Testing apparatus in accordance with claim 4 wherein the resonating means comprises a variable condenser.

11. A tester in accordance with claim 9 wherein the arm shaped to connect with the bushing of the spark plug to be tested is grounded to the case.

12. The method of measuring the condition of a dielectric with an oscillatory circuit and a metering circuit associated therewith which comprises generating electrical oscillations of known frequency in said oscillatory circuit, resonating said circuit to said oscillations, reading the intensity of oscillation by means of said metering circuit, shunting a capacitance including as its dielectric that to be tested across said oscillatory circuit re-resonating said oscillatory circuit to said frequency and reading the difference of intensity of oscillation under the new resonant condition to determine the condition of said dielectric.

13. The method of measuring the condition of a dielectric with an oscillatory circuit and a metering circuit associated therewith which comprises generating electrical oscillations of known frequency in said oscillatory circuit, regulating the transfer of energy to said metering circuit to give a predetermined normal reading, shunting a capacitance the dielectric whereof is that to be tested across said oscillatory circuit, re-resonating said oscillatory circuit to said frequency, and determining the condition of said dielectric by the deviation of the reading of said metering circuit from said normal reading.

RALPH W. THORNALLY.